United States Patent [19]

Detsch

[11] Patent Number: 5,160,438

[45] Date of Patent: Nov. 3, 1992

[54] METHOD AND MEANS OF SAMPLING LARGE REGIONS OF LIQUID FOR POLLUTION OR BIOLOGICAL ACTIVITY USING BUBBLES

[75] Inventor: Richard M. Detsch, Panama City Beach, Fla.

[73] Assignee: The United States of American as represented by the Secretary of the Navy, Washington, D.C.

[21] Appl. No.: 635,072

[22] Filed: Dec. 28, 1990

[51] Int. Cl.⁵ .............................................. C02F 1/24
[52] U.S. Cl. ................................... 210/707; 210/703; 210/706; 209/168
[58] Field of Search ................ 209/168; 210/703–707; 423/657; 73/865.5

[56] References Cited

U.S. PATENT DOCUMENTS

| | | | |
|---|---|---|---|
| 3,540,485 | 11/1970 | Kummins | 423/657 |
| 3,674,702 | 7/1972 | MacKenzie et al. | 423/657 |
| 3,786,139 | 1/1974 | MacKenzie et al. | 423/657 |
| 3,883,426 | 5/1975 | Lewandowski et al. | 210/707 |
| 4,155,712 | 5/1979 | Taschek | 423/657 |

Primary Examiner—Stanley S. Silverman
Assistant Examiner—Neil M. McCarthy
Attorney, Agent, or Firm—Harvey David

[57] ABSTRACT

A unique bubble production system and method for sampling and cleaning large regions of "dirty" or polluted bodies of water, or for otherwise sampling them for other biological activity. This is achieved by the use of millions to trillions of tiny chemical coated particles which are usually dispersed in air by suitable means to effect predetermined patterns of the particles and resultant bubble region as they descend in the water. The particular character of the particles and their selected dispersal mode assure the homogeneous generation of large concentrations of millions to trillions of bubbles throughout a predetermined volume of the water body so as to generate a planned and controlled bubble spectra for a selected applicational purpose. A bubble spectrum is a plot of the number of bubbles per volume as a function of bubble diameter.

1 Claim, 1 Drawing Sheet

METHOD AND MEANS OF SAMPLING LARGE REGIONS OF LIQUID FOR POLLUTION OR BIOLOGICAL ACTIVITY USING BUBBLES

STATEMENT OF GOVERNMENT INTEREST

The invention described herein may be manufactured and used by or for the Government of the United States of America for governmental purposed without the payment of any royalties thereon or therefor.

BACKGROUND OF INVENTION

This invention relates generally to a method and a system of sampling large regions of liquids for debris which easily attach to bubbles. More specifically, it relates to a method of generating large regions of bubbles in pools by means of dispersing chemically coated particles for the purpose of bringing debris to the surface, frequently associated with efforts to cleanse such regions, pools, or lakes.

Bubbles are important to many processes related to chemical engineering. Chemical engineers introduce bubbles into liquids to increase gas-liquid contacting, to agitate the liquid phase, and to produce foams and froths. Bubbles are also used to clean "dirty" liquids. A conventional bubbler (such as a device with many small holes through which a gas is passed) is placed near the bottom of a tank containing the dirty liquid. As bubbles rise to the surface they collect "debris", and carry it to the surface. A vacuum system can then be used to remove the debris from the surface.

Debris means any substance which is collected by the bubbles. It includes, but is not limited to, surfactant molecules, macro-molecules (like proteins and DNA fragments), oils (natural and synthetic), particulates (like dead organisms, soot, or mud), bacteria, pollutants, and micro-organisms (like algae). Pools mean any large body of water, including ponds, lakes, swimming pools, vats, tanks, bays, reservoirs, and oceans.

The bubbles generated in conjunction with the present method are formed from very large numbers (as large as billions or trillions) of dispersed chemically coated particles (typically less than 1 cm, and as small as 1 micron diameter) which will generate the desired bubbles.

Heretofore, chemical engineers have introduced bubbles into liquids either by violent mixing or by blowing gas through a perforated device having small holes submerged in the liquid. Both methods require immediate access to power and mechanical equipment. A new method is disclosed herein which represents a new technology not previously known or used for this purpose.

Virtually all bubble related phenomena are dependent upon the number and size distribution of bubbles present. The method described herein relates to the production of vast bubble-containing regions or patches where the shape of the region, and the size and number of bubbles, is controlled.

Water is frequently being sampled to determine the amount of pollutants, or biological organisms, or the turbidity, etc. Frequently, a number of small samples (on the order of a gallon) are extracted and analyzed to make predictions about average pollutant levels within the pool. A difficulty with this method is that the quantity being measured (say number of organisms per $cm^3$) can vary dramatically throughout the pool, and from a practical standpoint only a limited number of samples can be taken.

Previous methods have been employed to produce bubbles by releasing solid reactant into a liquid. They have suffered two drawbacks. They had little control over the bubble spectra (that is, the number of bubbles as a function of bubble diameter); and only a limited region could be exposed to the reactant. The present method overcomes these two drawbacks, and requires no special mechanical equipment or energy sources apart from that related to dispersing the particles.

The method is based on the well known ability of bubbles to scavenge particles that they pass when rising through the water. A laboratory method for cleaning water is to bubble it for several hours.

OBJECTS OF INVENTION

Accordingly, it is a primary object of the invention to provide a gas generating and gas releasing system and related method which generates bubbles in pools without using mechanical agitators or electrical power.

A further object is to generate vast bubble regions in which the bubbles would have a predetermined size spectra, and a predetermined pattern and/or area, and cover a generally predetermined volume within the liquid.

Another object is the development of a novel method for generating the vast bubble regions in pools by which to sample test it for pollutants, and/or to cleanse it thereafter if the test results so indicated the need therefor.

Still another object is to provide a unique method and system for effecting the introduction of chemicals into the various bodies of water to achieve the afore stated objectives.

BRIEF SUMMARY OF THE INVENTION

The foregoing and other objectives are achieved by methods and systems of this invention which provide a bubble production system which utilizes chemicals or chemically coated particles to produce large regions of gas bubbles within a pool. It is known that many inter-mixed solid-liquid reactions produce gas. For example, water plus lithium hydride produces hydrogen gas. Reactions of this sort have been used in the past to introduce gas into a liquid, i.e. hydrogen into water or seawater; and various oral medications such as the well-known Alka-Seltzer ® tablet which dissolves via bubble-forming reaction in a glass of water. However, in the present method the bubbles will be generated with a predetermined diameter, or spectral distribution of diameters.

The present invention contemplates two methods which can be used to affect the introduction of chemicals into the water via bubbles. As bubbles dissolve, the gas they contain is introduced into the liquid. By making the bubbles out of different gases, any desired gas could be dissolved into the pool (i.e. chlorine for the purpose of killing microorganisms). This use of bubbles (rather than say chlorine pellets) would allow the gas to be dissolved in controlled amounts, patterns, and without having the gas released above the surface of the pool. The second method for introducing chemicals into the pool would be to produce bubbles that were coated with non-gas-forming chemicals. These chemicals would dissolve as the bubble carried them through the water.

Bubble-producing particles of the present system can be released, above the surface, which will produce bubbles as they sink. The bubbles will collect debris as they rise, bringing it to the surface. This debris can then be collected and analyzed. The analysis would yield a better average than that obtained from a limited number of small samples. The particles can also be made so that they sink to a predetermined depth before producing bubbles. The depth dependence of the debris concentration could be obtained by comparing analyses from patches produced at different depths. It should be noted that the energy for this collection is chemically stored in the particles. No auxiliary energy source is needed, except that required to spread the particles and to run the surface skimmer. Therefore the particles and this method would be well suited for field work.

A laboratory method for cleaning water is to bubble it for several hours. The method is based on the well known ability of bubbles to scavenge particles that they pass when rising through the water. While it would be difficult to thoroughly clean a pool of water with the particles, it would be possible to bring a percentage of debris to the surface of the water. This procedure would be useful to make environmental or biological surveys. For example, an environmental engineer might measure the contamination of the surface before and after releasing the particles in order to determine the amount of contamination that was originally present in the bulk of the water. The method may also include the measuring of the generated bubble spectra to determine the effectiveness of the bubbles to bring the debris to the surface. A means for measuring the generated bubble spectra can include photographic techniques, laser scattering techniques, and sonar techniques.

It should be appreciated and apparent that the present invention is not merely an obvious extension of the prior art use of just any gas-generating chemical. This is because of this newly developed and previously unrecognized method and system which novelly provides for a certain cumulative interaction of the bubbles with the water-contained pollutants or debris. This improved cumulative interaction includes both the upward flow thereof generated by the rising bubbles, and the unique generated bubble spectra with attendant ability to better control bubble size, type formation, and longevity. This results in the bubbles becoming more effectively coated with the various debris to provide greater amount surfacing not only for improved sampling but also to facilitate better collecting and cleansing of the liquid region.

Surface skimmer technology is well developed, so there should be no difficulty in measuring the surface contamination. Usually a skimmer consists of a rotating drum which collects the debris skin on the top of the water. The skimmer could be as small as laboratory models (several feet wide) or as large as systems used during oil spills (an entire specialized ship).

These aforestated objectives and advantages will become apparent from the following detailed description taken in conjunction with the illustrative drawings figures.

BRIEF DESCRIPTION OF THE DRAWINGS FIGURES

DETAILED DESCRIPTION OF KNOWN BEST MODES

Figure 1:
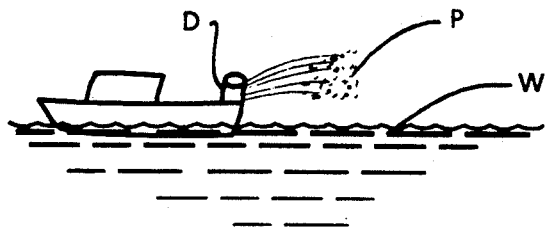
FIG. 1 is a side elevational pictorial representation depicting dispersal of the chemically coated particles from a boat.

In accordance with a highly advantageous and best mode embodiment of the invention, an arrangement is provided which generates a large group of bubbles distributed within a large liquid volume, hereafter termed a bubble region, and having a predetermined bubble size spectra. In one manner of dispersal, depicted in FIG. 1, chemically coated particles P are distributed by a boat-mounted suitable distributor device D which may include a rotating paddle similar to those used to spread or broadcast grass seed or road salt. After contacting the water W, the chemical coating on each particle will combine with the water to produce a stream of bubbles B. The size of the bubbles will have a predetermined spectra, determined primarily by the shape, size, and density of the particles.

The shape of the particles will assure that gas will form a bubble that will remain attached to the particle until reaching a predetermined size. The buoyancy force of the bubble would then cause detachment. Enough reactant would be on each particle to produce many bubbles. Thus, each particle would deposit a vertical stream of bubbles. Taken together, the millions to trillions of dispersed particles would create a significantly large field of bubbles which would bring a significant amount of debris to the surface, where it could be collected with a surface skimmer.

Figure 2A:
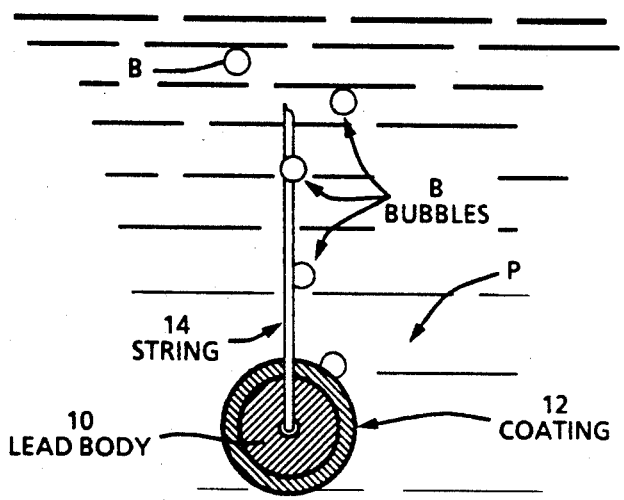
FIGS. 2A and 2B represents enlarged cross-section views through two exemplary forms of chemically coated particles.

FIG. 2A illustrates a basic, simple, generally spherical shape particle generally denoted P. In this example, particle P is made up of three component parts, a dense material center body 10 such as lead, an outer chemical coating 12 such as lithium hydride or any chemical coating capable of generating a gas after contacting the water, and a firmly attached durable material string 14. A lithium hydride coating 12 reacts with the water to produce hydrogen gas. The string 14 is preferably of a synthetic type fiber such as nylon. The length and diameter of the string 14 help determine the size of the released bubbles 24. The size of the center body 10 would be large enough to assure an adequate sink rate, but small enough to allow a sufficient number to be dispersed. Typical sizes would about one micron to about 1 cm diameter. The attached string 14 would have a typical diameter between 10 and 50% of the body's diameter, and a length from 2 to 20 times as long.

Figure 3A:
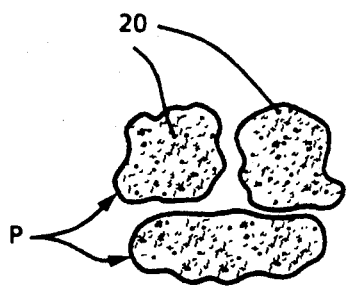
FIGS. 3A, 3B, and 3C represent other contemplated forms of the particles.
Figure 3B:
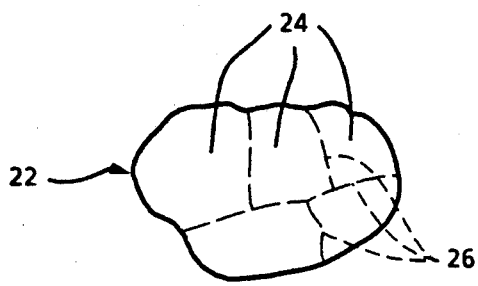
Figure 3C:
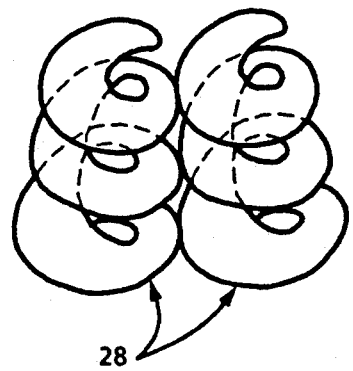

Many variants of the particles or subgroups thereof are possible including such irregular forms as depicted in FIGS. 3A, 3B, and 3C. The particles may be designed to have any shape, even including tear-drop, star or cruciform shape, which facilitates the release of the bubbles of a predetermined size. For example, bubbles formed at the front of a tear-drop shaped particle would cling to the front at first, then after growing some would slide towards the back, after growing some more it would finally separate, the final size would be determined in part by the rate of taper of the rear of the particle, and the particles may or may not have tails. The diameter and length of the tail would be one factor in determining the final size of released bubbles. In one variant, the particles would be shaped like a small propeller or spiral such that it rotates while sinking. The rotation would set up shear forces that would tear off bubbles after they reached a predetermined size.

Figure 2B:
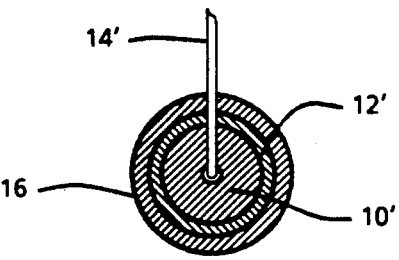

The particles may be provided with one or more further coatings some of which will not produce gas, as shown in FIG. 2B. The particle P' of FIG. 2B comprises the same basic components designated by primed reference characters, i.e. 10', 12', 14'. By use of an outer water soluble, non-gas-producing coating 16, the bubble-forming chemical coating 12' is temporarily shielded so as to delay the bubble formation for a predetermined time period or until the particles have descended to their predetermined depth. This is desirable where deep bubble fields or patches are desired.

It is further contemplated that for some applications, the particles would be released as groups of particles which are "glued" together with a substance that dissolves in the water. Various chemicals could be used for the purpose including those as simple as dried sugar compounds like those found in some hard candies. FIG. 3A depicts a representative grouping of three such "glued-together" groups each denoted 20. After immersal in water, a group would breakup into individual particles, the benefit being that the groups may be easier to disperse in air than the smaller individual particles. Also, the group would tend to sink faster than individual particles. The groups could vary in size from several to perhaps hundreds of individual particles. And, the group may have a shape and glue pattern that facilitates a homogeneous dispersion of the particles. For example, conglomerate groups denoted generally at 22 in FIG. 3B may comprise several sub groups each denoted 24 which may be lightly glued along dotted lines 26 so they break apart soon after impact. Additionally, referring to FIG. 3C each sub group may be generally spiral shaped as designated at 28 to spiral in a haphazard manner so that the sub groups become further separated as they sink; this would prevent bubbles from rising along a path that had already been "cleaned" by another bubble.

OTHER MODIFIED EMBODIMENTS/USES

The invention also has other applications. Chemical engineers frequently use bubbles to increase gas-liquid reaction rates. Bubble reactors, like those based on the prior type bubbler mentioned hereinabove, are used for this purpose. The coated particles of this application can be used to "store" bubbles. When the particles are brought into contact with a liquid, a gas-liquid reaction will ensue. Note, that unlike the conventional type bubble reactor which uses bubbling or stirring, this further application does not require energy, and the particles can be stored indefinitely as long as the particles are protected from moisture. A somewhat similar prior art device is used as a disposable light source for campers. There, two chemicals are enclosed in a clear plastic container with a thin membrane separating the chemicals. By bending the outer container, the membrane is broken and the two chemicals come together producing light for several hours. That light source requires no batteries or external power and can be stored for years. A similar device could be conceived in which one of the two chemicals is a gas. However, in order for the two chemicals to react properly the user would have to continuously shake the container. The method and use of coated particles as described in the present application could be used to maintain a constant reaction without shaking. In this case the particles could be nearly buoyant. As they sank they would produce a bubble, which in this variant of the invention, would not detach. The particle-bubble combination would be neutrally buoyant until the bubble dissolved, and thus would not quickly rise to the surface. Then the particle would sink, and the process would repeat over and over until the chemical coating on the particle was depleted. In this way, the gas generated by the coating would be continuously exposed to the liquid reactant, and not merely rise to the surface. A neutrally buoyant character is achieved as by suitable use of any slowly reacting chemicals, or selecting a particle with predetermined varied surface characteristic, either by physical shape or chemical composition, which in turn will vary the inherent surface adhesion to a bubble. This is a known particle-surface phenomenon. Another application is contemplated where the reaction will produce heat, rather than light, and can be used to warm a camper. In a still further application, the bubbles could be used to carbonate a beverage; the advantage here being that the container would not be pressurized until the particles were activated.

In accordance with a yet further use of the invention, the particles would be used to disperse a chemical through the dissolution of bubbles; for example particles coated with a chemical that produces chlorine gas could be used to purify the water in a swimming pool or reservoir. Since the chlorine would be release more homogeneously than by conventional methods, the "down" time after chlorinating a swimming pool could be reduced. Very small bubbles, having diameters between 1 and 1000 microns, would be used here to make sure no gas was released above the water. Or, in a police search for a missing body in a pond of murky water, the chlorine could kill organisms and in a period of an hour or so the water would be clearer.

In accordance with a yet further use of the invention, the particles would be used to collect silt or mud particles to increase visual clarity of the water. Like the above use, it could be used to help in police searches in murky water. However, instead of killing biological organisms which fall to the bottom, the bubbles would be used to carry the mud to the surface. Since the mud would be carried with the bubbles, only a few minutes would pass until the water was clear. Thus the system could be used even in water that had some movement.

In accordance with a yet further use, the particles would be coated with two different chemicals where the first coating is used to produce bubbles and the second is a non-gas-producing chemical that is to be distributed through the water. The second chemical would be on the surface of the bubbles when they are released from the particle. As the bubbles rise, the second chemical dissolves into the water. Since each particle produces many bubbles, this method would effect a more thorough and uniform distribution of the second chemical than that attained by just dropping solid particles that were coated with the chemical.

In accordance with a still further use, the particles would be coated with a chemical that reacted with other liquids besides water.

From the foregoing detailed description it is apparent that a unique method and system have been evolved which represent a marked advantage over the prior mentioned methods of chemical intermixing with and cleansing of bodies of water, and water sampling, the latter of which primarily were limited to the collecting a series of small samples to make predictions on average water quality measurements. Those methods generally collect a much smaller sample volume than afforded by the larger regions of bubbles generated by the present invention.

While the best known modes of the method and system have been described, other modifications may occur to those skilled in the art without departing from the spirit and scope of the invention as defined in the appended claims.

What is claimed is:

1. A method for surfacing debris suspended in a body of water by generating gas bubbles of a predetermined bubble spectra within said body of water, said method comprising the steps of:

a. determining a desired number of bubbles to be generated in said body of water as a function of the diameter of the bubbles generated to obtain a predetermined bubble spectra;

b. providing a supply of bubble-generating particles which react with the water in said body of water to form bubbles within said body of water, said supply of bubble-generating particles having been selected in size, shape, and density to provide bubbles having said predetermined bubble spectra within said body of water; said particles comprising a chemical which is reactive with water to form said bubbles and ranging in size from about fifty microns to about one centimeter;

c. dispersing said supply of bubble-generating particles in preselected patterns onto the surface of said body of water to form bubbles having said predetermined bubble spectra;

d. allowing the bubbles to rise to the surface of said body of water thereby collecting and surfacing debris suspended in said body of water.

* * * * *